US012665825B2

(12) United States Patent    (10) Patent No.:   US 12,665,825 B2

Olvera-Hernandez et al.    (45) Date of Patent:   Jun. 23, 2026

(54) OPERATOR CONTROLLED ARTIFICIAL INTELLIGENCE (AI)/MACHINE LANGUAGE (ML) WTRU DATA COLLECTION EXPOSURE FRAMEWORK

(71) Applicant: InterDigital Patent Holdings, Inc., Wilmington, DE (US)

(72) Inventors: Ulises Olvera-Hernandez, Saint-Lazare (CA); Michael Starsinic, Newtown, PA (US); Oumer Teyeb, Montreal (CA); Taimoor Abbas, Sainte-Julie (CA); Samir Ferdi, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 5 days.

(21) Appl. No.: 18/940,581

(22) Filed: Nov. 7, 2024

(65) Prior Publication Data

US 2026/0128969 A1   May 7, 2026

(51) Int. Cl.
     *H04L 43/04*      (2022.01)
     *H04W 24/08*      (2009.01)

(52) U.S. Cl.
     CPC ............. *H04L 43/04* (2013.01); *H04W 24/08* (2013.01)

(58) Field of Classification Search
     CPC ............................... H04L 43/04; H04W 24/08
     USPC ......................................................... 709/224
     See application file for complete search history.

(56) References Cited

U.S. PATENT DOCUMENTS

| | | | |
|---|---|---|---|
| 2024/0137785 A1* | 4/2024 | Aghili | H04W 36/24 |
| 2024/0283714 A1 | 8/2024 | Pan et al. | |
| 2025/0358676 A1* | 11/2025 | Di Girolamo | H04L 47/32 |
| 2025/0374355 A1* | 12/2025 | Methenni | H04W 76/15 |

OTHER PUBLICATIONS

3rd Generation Partnership Project; "Technical Specification Group Services and System Aspects; System architecture for the 5G System (5GS); Stage 2 (Release 19)", 3GPP TS 23.501 V19.1.0, Sep. 2024, 735 pages.

3rd Generation Partnership Project; "Technical Specification Group Services and System Aspects; Procedures for the 5G System (5GS); Stage 2 (Release 19)", 3GPP TS 23.502 V19.1.0, Sep. 2024, 941 pages.

3rd Generation Partnership Project; "Technical Specification Group Services and System Aspects; Data Collection and Reporting; General Description and Architecture (Release 18)", 3GPP TS 26.531 V18.2.0, Jun. 2024, 38 pages.

(Continued)

*Primary Examiner* — Nicholas R Taylor

(74) *Attorney, Agent, or Firm* — Flaster Greenberg P.C.

(57)         ABSTRACT

A wireless transmit/receive unit (WTRU) may comprise a processor configured to determine that a data collection configuration is not available from a direct data collection client (DDCC) of the WTRU. The processor may send a request associated with the data collection configuration to an application server, wherein the request comprises an application identifier, an indication of a user profile, and a protocol data unit (PDU) session identifier. The processor may receive the data collection configuration, wherein the data collection configuration comprises data collection policies that indicate conditions upon which the WTRU is to collect the data, and wherein the data collection policies indicate whether and where the WTRU is to send the collected data.

20 Claims, 14 Drawing Sheets

(56)  References Cited

OTHER PUBLICATIONS

3$^{rd}$ Generation Partnership Project; "LS on AIML data collection", RP-242389, 3GPP TSG RAN Meeting #105, Melbourne, Australia, Sep. 9-12, 2024, 5 pages.

3GPP TS 23.288 V19.0.0, "Architecture enhancements for SG System (SGS) to support network data analytics services (Release 19)", 3GPP TS 23.288 V19.0.0, 3rd Generation Partnership Project; Technical Specification Group Services and System Aspects Mobile Competence Centre; 650, Route Des Lucioles; F-06921 Sophia-Antipolis Cedex; France, XP052649912, Sep. 2024, 331 pages.

3GPP TS 26.532 V18.3.0, "Data Collection and Reporting; Protocols and Formats; (Release 18)", 3GPP TS 26.532 V18.3.0, 3rd Generation Partnership Project; Technical Specification Group Services and System Aspects, Sep. 2024, 87 pages.

\* cited by examiner

200

202

0. WTRU-Data Collection Configuration and Provisioning
(WTRU-Data Collection configuration and provisioning is assumed to be controlled by the RAN)

204

1. Initiate Data Collection
(Triggered either by NW configuration or request from WTRU for data collection)

206

2. Establish a PDU Session
(It may be established prior to step 1)

208

3. Use the PDU Session for Data Collection

400

WTRU

WTRU-Data Collection Application

Data Collection and reporting configuration

Data reporting

Status Notification

AT-Commands

R7

Direct Date Collection Client

Terminal Equipment (TE)

800 ⎯

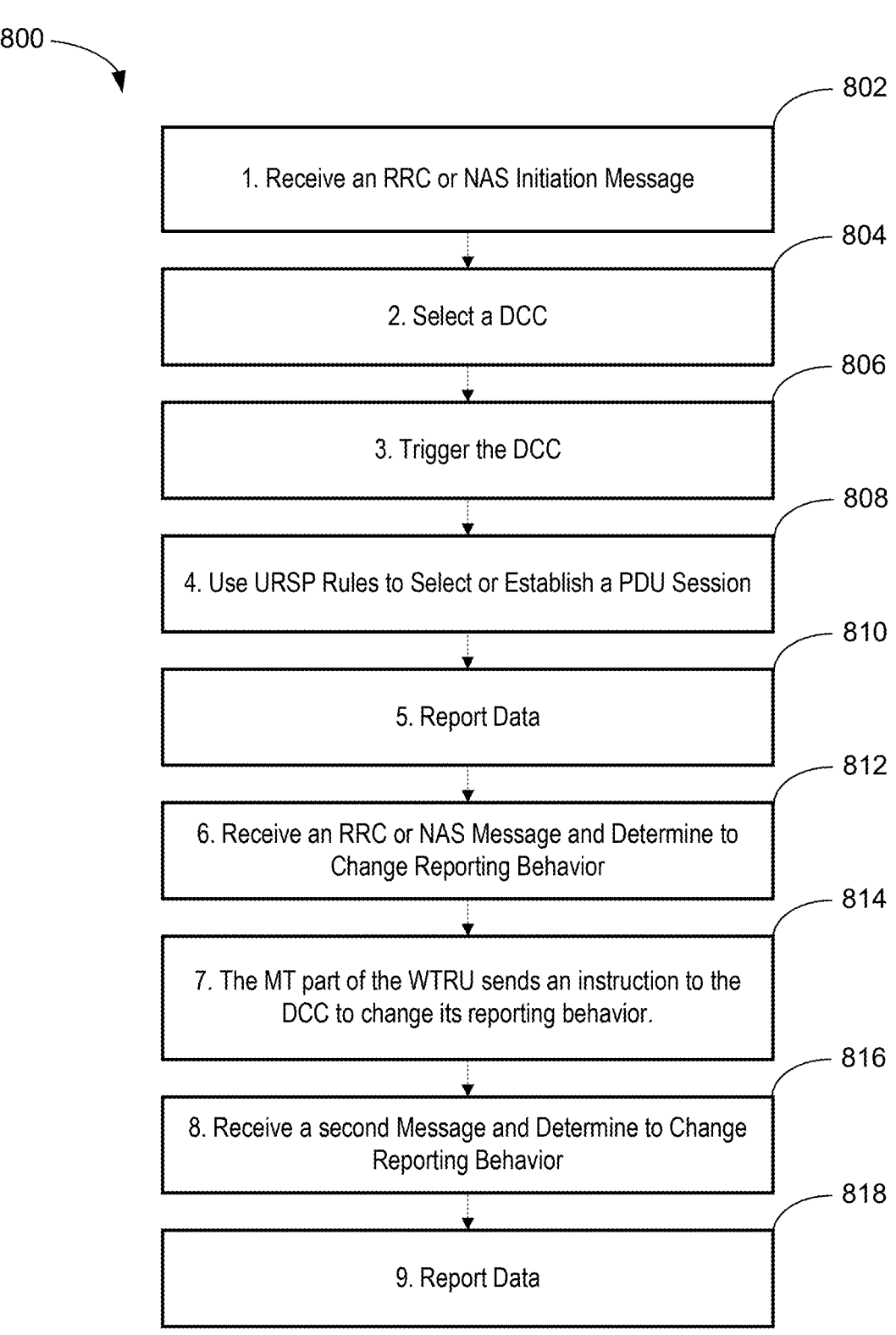

802

1. Receive an RRC or NAS Initiation Message

804

2. Select a DCC

806

3. Trigger the DCC

808

4. Use URSP Rules to Select or Establish a PDU Session

810

5. Report Data

812

6. Receive an RRC or NAS Message and Determine to Change Reporting Behavior

814

7. The MT part of the WTRU sends an instruction to the DCC to change its reporting behavior.

816

8. Receive a second Message and Determine to Change Reporting Behavior

818

9. Report Data

FIG. 8

OPERATOR CONTROLLED ARTIFICIAL INTELLIGENCE (AI)/MACHINE LANGUAGE (ML) WTRU DATA COLLECTION EXPOSURE FRAMEWORK

BACKGROUND

Mechanisms and frameworks have been specified for using AI/ML based approaches for both the air interface level (e.g., CSI-feedback enhancements (e.g., CSI compression), beam management/prediction and WTRU positioning) and/or network level (e.g., network energy saving, load balancing and mobility).

AI/ML operations are based on models (e.g., neural networks) that have been trained using a substantial amount of data under different scenarios/conditions. The conditions may be WTRU-side conditions (e.g., speed) or network-side conditions (e.g., antenna pattern, load, etc.,). These conditions are referred to as WTRU-side additional conditions and network-side additional conditions, respectively.

For a given AI/ML functionality, there could be several models (e.g., each model trained and/or suitable for different network and/or WTRU side additional conditions).

Once a model is well trained, it may be deployed in a test environment (e.g., test network) for performance testing. Model monitoring may need to be performed even after deployment in a real network, as the current network and/or WTRU conditions may become different from the scenarios and/or conditions in which the model was trained and/or tested. If the model monitoring is shown to provide undesirable WTRU and/or network performance, a decision may be made to switch to another model and/or stop using AI/ML based operations for the concerned function, etc., The performance monitoring can also be used to determine whether a model needs to be retained with new sets of data.

Model training and/or monitoring may be performed at the WTRU, at the network, and/or in collaboration between the two. Model training and/or monitoring may be performed offline or online.

A given AI/ML model may be trained under certain WTRU and/or network conditions. For example, a WTRU condition may be the speed of the WTRU. On the other hand, network conditions may be something that may be related to some network configurations and/or settings that the WTRU may not be aware of but may impact the performance of the model. For example, an AI/ML beam management model may perform differently if it is trained when the network was using a certain antenna pattern, beam pattern, power levels, and so on. Also, there may be aspects related to network load, that may have impact on the model performance. Since the WTRU doesn't necessarily need to know all these, and network may also not want to expose some of these implementations, the network may hide these details by signaling to the WTRU (e.g., via broadcast signaling, dedicated signaling, etc.,) a network configuration index and/or associated ID. For example, when data is being collected for training a model, tagging may be performed indicating under which network conditions the model is being trained. When a WTRU is being configured to perform an AI/ML operation, it may be configured to check the consistency between the conditions under which the AI/ML model is trained on and current conditions (e.g., current WTRU conditions, current associated ID signaled by the network indicating current network conditions/settings, etc.,).

The topic of data collection has been studied. Data collection is a function that provides input data to the model training, management, and inference functions. Data collection is performed for the purpose of AI/ML model training.

Model training is a function that performs AI/ML model training, validation, and testing which may generate model performance metrics that may be used as part of the model testing procedure. The model training function may also be responsible for data preparation (e.g., data pre-processing and cleaning, formatting, and transformation) based on training data delivered by a data collection function, if required. If a model storage function is used, the model training function may be used to deliver trained, validated and tested AI/ML models to the model storage function.

According to studies, for all types of offline model training (i.e., WTRU-side, network (NW)-side, and/or two-sided mode training), there is no latency requirement for data collection.

When designing system enhancements to support data collection procedures, consideration should be given to what type of data may be reported and what type of data needs to be reported. Examples of the type data the needs to be reported may be data related to model input, data related to ground truth, data that can provide assistance when categorizing the data, and information about the quality of the data (e.g. relevance of the data to the training, uniformity of the data contents, etc.,).

When designing system enhancements to support data collection procedures, consideration should be given to how the WTRU may be configured to perform the reporting of the collected data.

When designing system enhancements to support data collection procedures, consideration should be given to whether the WTRU is able to report information that is proprietary. Proprietary refers to information that is reported by the WTRU and is not necessarily standardized. For example, the information may be collected by the mobile network operator (MNO) and provided to the handset manufacturer.

In order to support an AI/ML model that is resident on the WTRU, different mechanisms may be used for collecting training data from the WTRU. One option may be called option 1a. In option 1a, the WTRU may collect data and transfer the data for training to an over the top (OTT) server and the transfer may take place in a way that the transfer is transparent to the cellular network (e.g., the collected data will be transmitted like any other user plane data, like internet browsing, streaming, etc.). Another option may be called option 1b. In option 1b, the WTRU may collect data and transfer the data for training to an OTT server and the transfer may take place in a way that the transfer is not transparent to the cellular network (e.g., even though the collected data is directly sent to an OTT server, the MNO is aware that the data collection and/or transfer is happening and may have some control over it, for example, the control of the transmission of the collected data). Another option may be called option 2. In option 2, the WTRU may collect data and transfer the data for training to the core network. The core network can then transfer the data to an OTT Server. Another option may be called option 3. In option 3, the WTRU may collect data and transfer the data for training to an Operations, Administration and Maintenance (OAM) system. The OAM system can then transfer the data to an OTT server.

The data collection mechanism may be designed such that an MNO can manage data transfer to the OTT server. Managing means controlling the initiation, timing, and destination of the data transfer.

The term 'transparent" refers to the visibility of the data to the cellular network. Data is visible if the cellular network (i.e. the MNO of the cellular network) is able to detect that the WTRU is transmitting training data and is able to access and understand (e.g., comprehend and/or interpret) the training data.

Standards may offer the possibility to collect data from WTRU applications that may be used for ML model training and generation of network analytics. For example, in a current data collection procedure, both the data collection server function (DCSF), and the WTRU may be configured, per application ID, by an application service provider (ASP), including data collection parameters and information the WTRU is authorized to provide, authentication and authorization information and details regarding the data collection application function address the WTRU may send the collected data to.

In the existing WTRU application data collection functionality, the configuration mechanism, and the connection establishment procedure that connects the WTRU application to the DCSF, are application specific, thereby making it dependent on how the application is defined and where the configuration information is specified, this is sometimes referred to as "domain specific data" and it may or may not be specified. Furthermore, multiple protocol data unit (PDU) sessions may need to be established to collect data for more than one application.

Triggering mechanisms for data collection are also somehow application specific, and as such they may determine whether data collection is initiated by the WTRU, the DCSF or the ASP. Furthermore, the current specification may rely on network data analytics function (NWDAF) to trigger WTRU data collection procedures, and as such data is collected based on event IDs and event Filters.

Enabling MNO controllability for WTRU application data collection may imply access to the application data that enables WTRU data collection measurements as well as configuration of appropriate event IDs and event Filters.

SUMMARY

A wireless transmit/receive unit (WTRU) may comprise a processor. The processor may be configured to determine that a data collection configuration is not available from a direct data collection client (DDCC) of the WTRU. The processor may be configured to send a request associated with the data collection configuration to an application server, wherein the request comprises an application identifier, an indication of a user profile, and a protocol data unit (PDU) session identifier. The processor may be configured to receive the data collection configuration. The WTRU may receive the policies from both the DCSF and the policy control function (PCF). In some cases, the WTRU may need to conduct a check to ensure that the policies received from the DCSF are aligned with those policies received from the PCF. The data collection configuration may include, for example, data collection policies that indicate conditions upon which the WTRU is to collect the data, and wherein the data collection policies indicate whether and where the WTRU is to send the collected data. For example, the policies indicate what to send (e.g., what type of data it can be sent), where to send it (e.g., to what DCSF) and/or whether data may be sent at all and when. For example, if the channel conditions are poor, data should not be sent. For example, if certain data volume has been reached, no further data should be sent.

The conditions indicated by the data collection policies may include, for example, a time limit, a size limit, location of the WTRU, a speed of the WTRU, a battery level of the WTRU, or a data activity of the WTRU.

The data collection policies may indicate, for example, whether and where the WTRU is to send the collected data based on (i) location of the WTRU, (ii) a data type associated with the collected data, (iii) network conditions, or (iv) time. The location may include, for example, whether the WTRU is at a visited public land mobile network (PLMN) or home PLMN. The time may include, for example, the time that the WTRU sends the data. Furthermore, the data collection policies may indicate a threshold for when data can be sent, and once reached, data cannot longer be sent. For example, the threshold may be when a certain data volume has been reached, when a certain channel condition exists, a CSI value has been reached, and/or when certain battery level or network load has been reached.

The processor may be configured to send the collected data in accordance with the data collection configuration.

The processor may be configured to send a request to the DDCC for the data collection configuration, wherein the request comprises the application identifier and the indication of the user profile. The processor may be configured to receive a response from the DDCC that indicates that the data collection configuration does not exist at the DDCC. The processor may be configured to determine that the data collection configuration is not available from the DDCC based on the response from the DDCC.

The processor may be configured to determine the PDU session identifier via the use of AT-Commands.

The processor may be configured to receive the PDU session identifier from the DDCC.

The processor may be configured to determine the PDU session identifier via an instantiation of a DCAL layer.

The processor may be configured to receive the data collection configuration at an application layer via the DDCC.

The processor may be configured to validate the data collection configuration based on a comparison between the data collection policies of the data collection configuration and a configuration received from a radio access network (RAN). There may be two alternatives to correlate the policies, and both may use the PDU Session ID. The comparison may be on policies received from the non-access stratum (NAS) layer (e.g., the session management entity in the WTRU) and/or the RRC layer.

A WTRU may be configured to perform a method that includes one or more of the following steps. The method may include determining that a data collection configuration is not available from a direct data collection client (DDCC) of the WTRU. The method may include sending a request associated with the data collection configuration to an application server, wherein the request comprises an application identifier, an indication of a user profile, and a protocol data unit (PDU) session identifier. The method may include receiving the data collection configuration. The WTRU may receive the policies from both the DCSF and the policy control function (PCF). In some cases, the WTRU may need to conduct a check to ensure that the policies received from the DCSF are aligned with those policies received from the PCF. The data collection configuration may include, for example, data collection policies that indicate conditions upon which the WTRU is to collect the data, and wherein the data collection policies indicate whether and where the WTRU is to send the collected data. For example, the policies indicate what to send (e.g., what type of data it can be sent), where to send it (e.g., to what DCSF) and/or whether data may be sent at all and when. For example, if the channel conditions are poor, data should not be sent. For example, if certain data volume has been reached, no further data should be sent.

The conditions indicated by the data collection policies may include, for example, a time limit, a size limit, location of the WTRU, a speed of the WTRU, a battery level of the WTRU, or a data activity of the WTRU.

The data collection policies may indicate, for example, whether and where the WTRU is to send the collected data based on (i) location of the WTRU, (ii) a data type associated with the collected data, (iii) network conditions, or (iv) time. The location may include, for example, whether the WTRU is at a visited public land mobile network (PLMN) or home PLMN. The time may include, for example, the time that the WTRU sends the data. Furthermore, the data collection policies may indicate a threshold for when data can be sent, and once reached, data cannot longer be sent. For example, the threshold may be when a certain data volume has been reached, when a certain channel condition exists, a CSI value has been reached, and/or when certain battery level or network load has been reached.

The method may include sending the collected data in accordance with the data collection configuration.

The method may include sending a request to the DDCC for the data collection configuration, wherein the request comprises the application identifier and the indication of the user profile. The method may include receiving a response from the DDCC that indicates that the data collection configuration does not exist at the DDCC. The method may include determining that the data collection configuration is not available from the DDCC based on the response from the DDCC.

The method may include determining the PDU session identifier via the use of AT-Commands.

The method may include receiving the PDU session identifier from the DDCC.

The method may include determining the PDU session identifier via an instantiation of a DCAL layer.

The method may include receiving the data collection configuration at an application layer via the DDCC.

The method may include validating the data collection configuration based on a comparison between the data collection policies of the data collection configuration and a configuration received from a radio access network (RAN). There may be two alternatives to correlate the policies, and both may use the PDU Session ID. The comparison may be on policies received from the non-access stratum (NAS) layer (e.g., the session management entity in the WTRU) and/or the RRC layer.

6

Figure 1A:
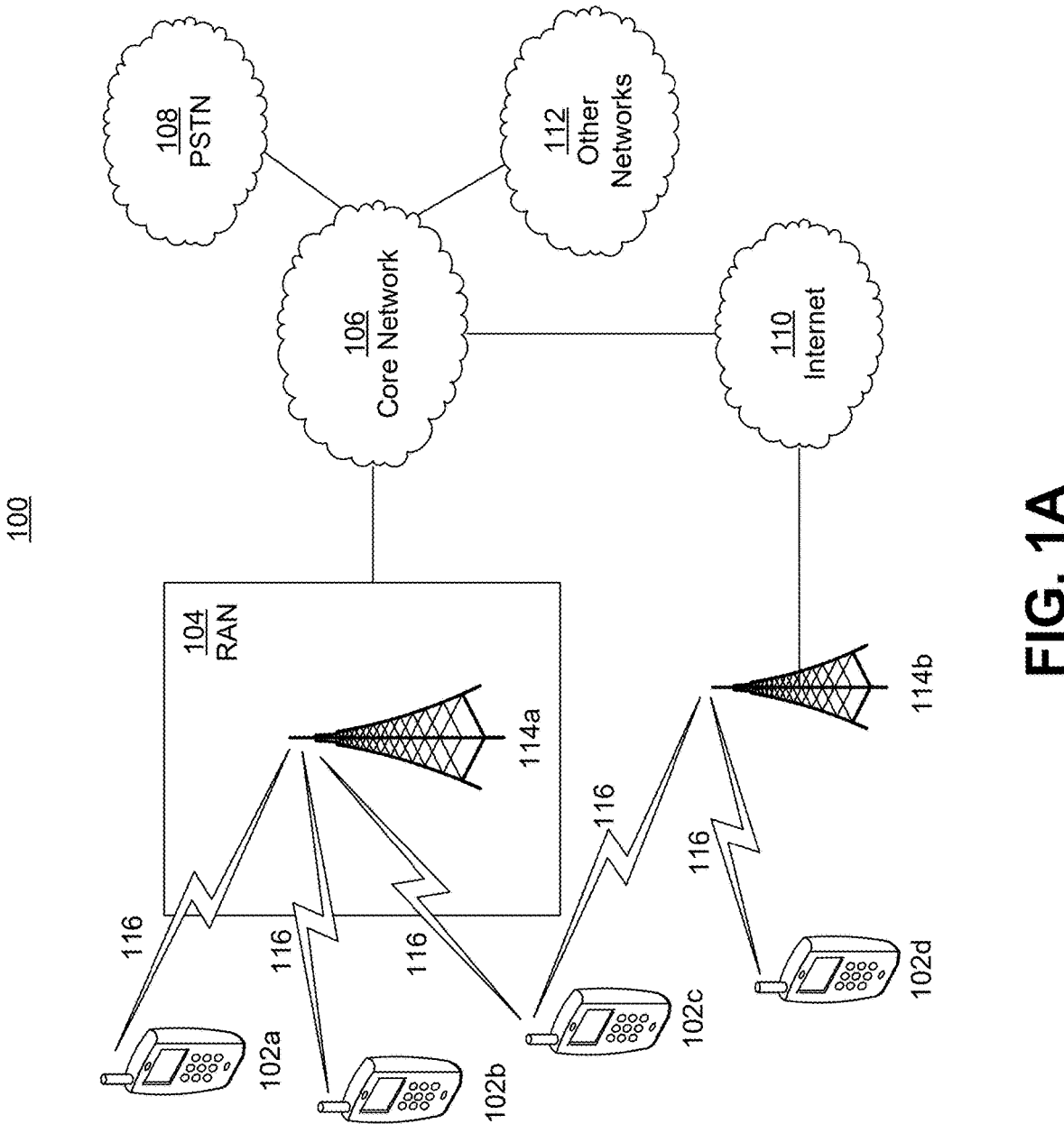
FIG. 1A is a system diagram illustrating an example communications system in which one or more disclosed embodiments may be implemented.
Figure 1B:
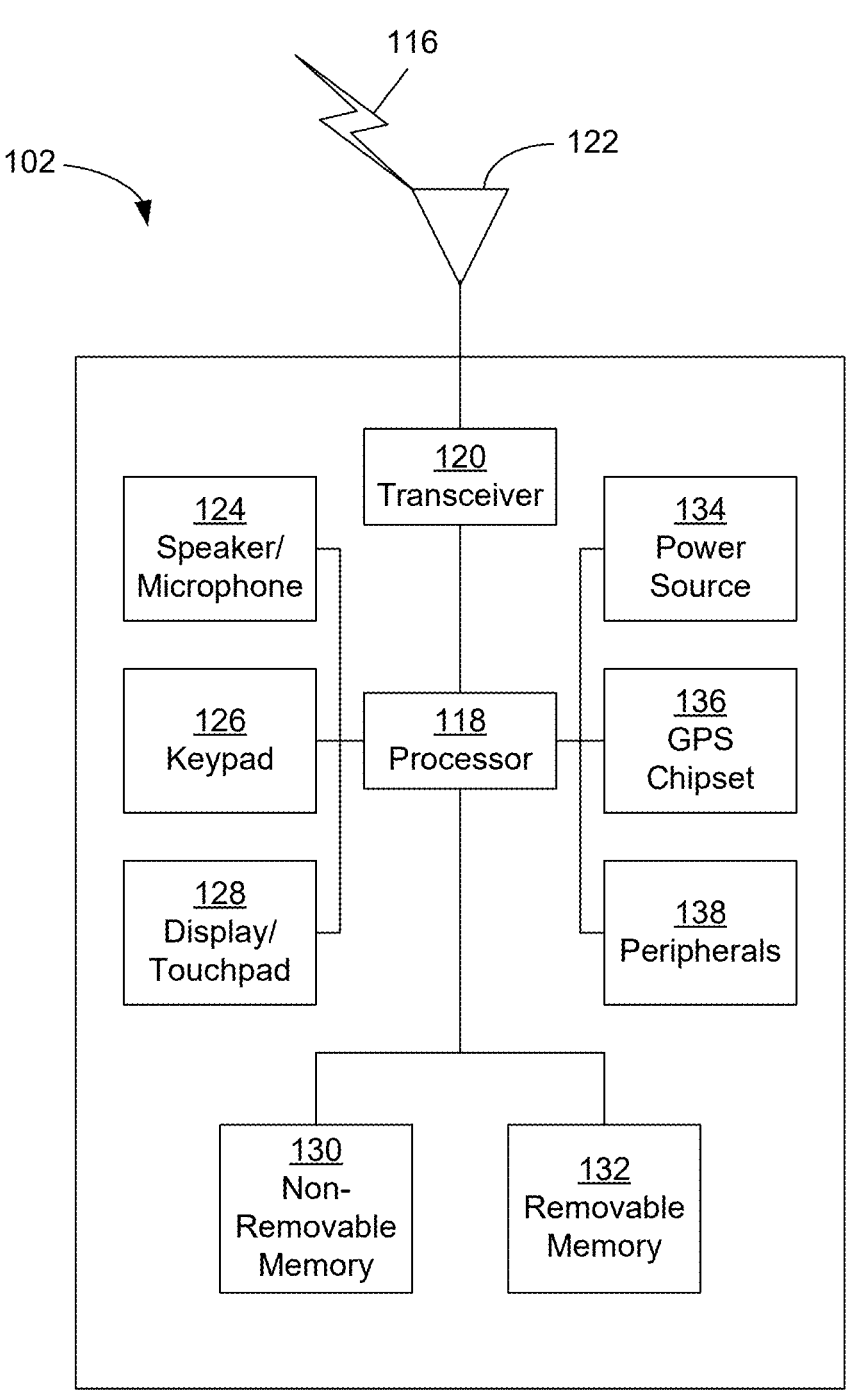
FIG. 1B is a system diagram illustrating an example wireless transmit/receive unit (WTRU) that may be used within the communications system illustrated in FIG. 1A according to an embodiment.
Figure 1C:
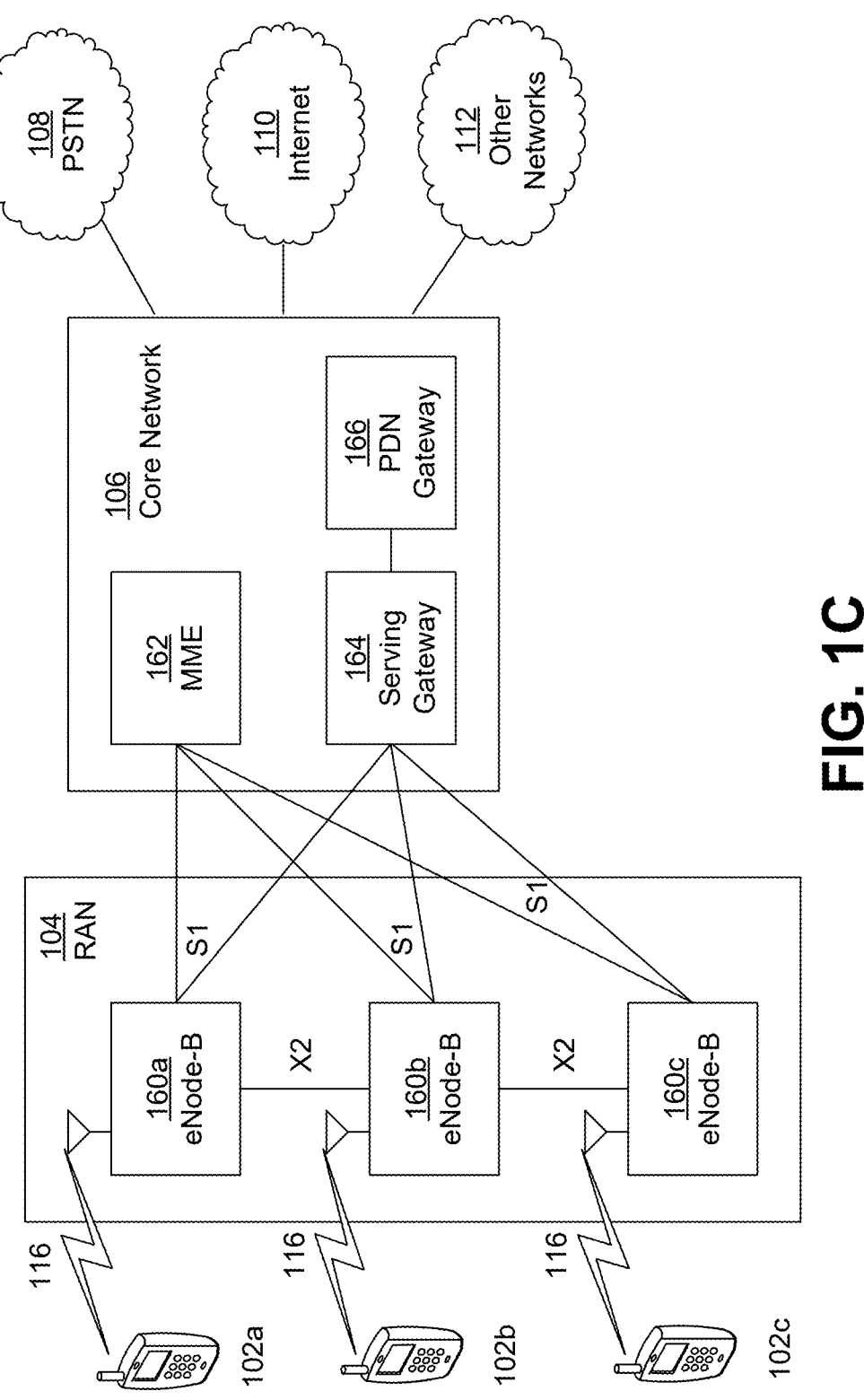
FIG. 1C is a system diagram illustrating an example radio access network (RAN) and an example core network (CN) that may be used within the communications system illustrated in FIG. 1A according to an embodiment.
Figure 1D:
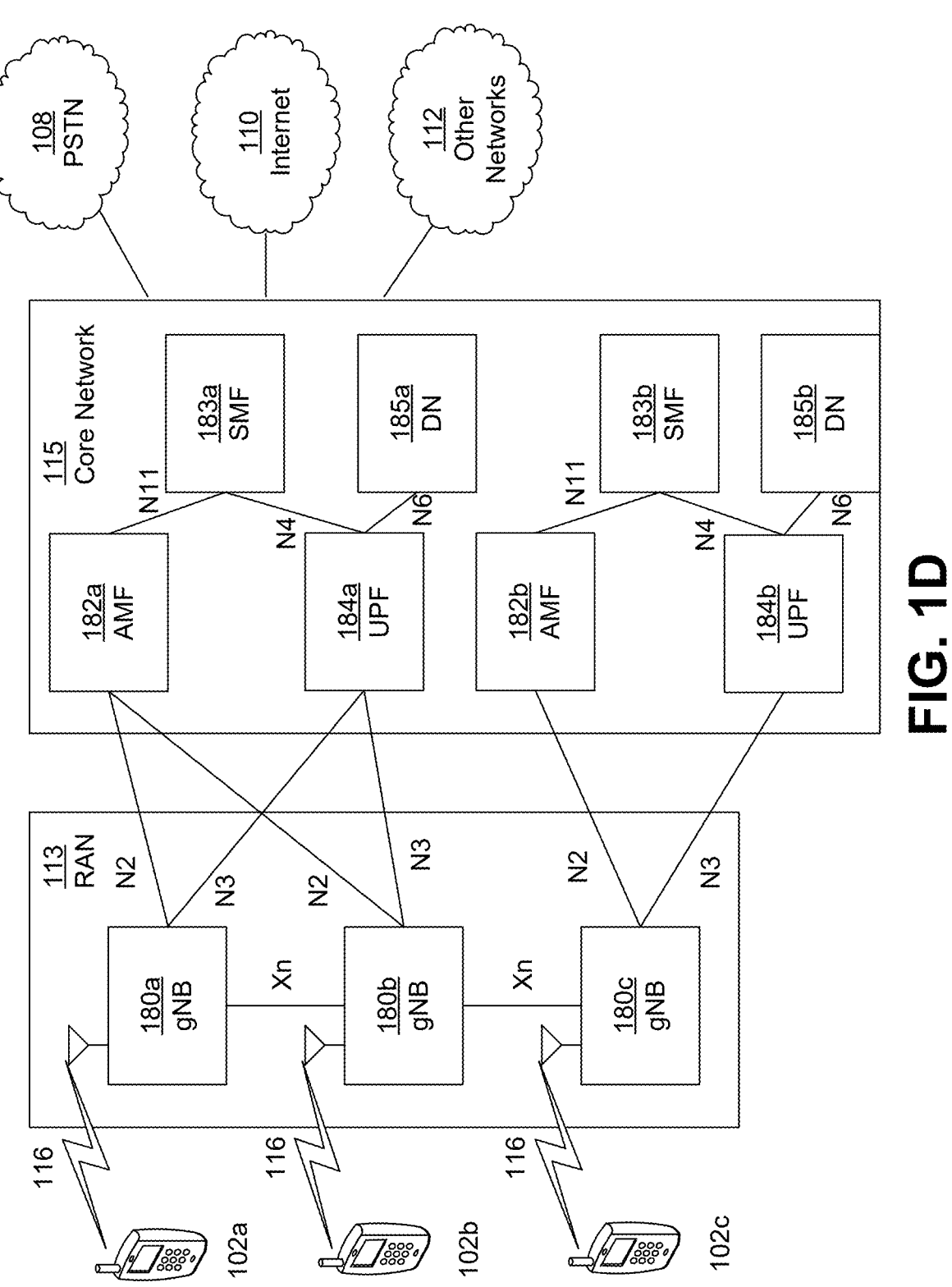

FIG. 1D is a system diagram illustrating a further example RAN and a further example CN that may be used within the communications system illustrated in FIG. 1A according to an embodiment.

Figure 2:
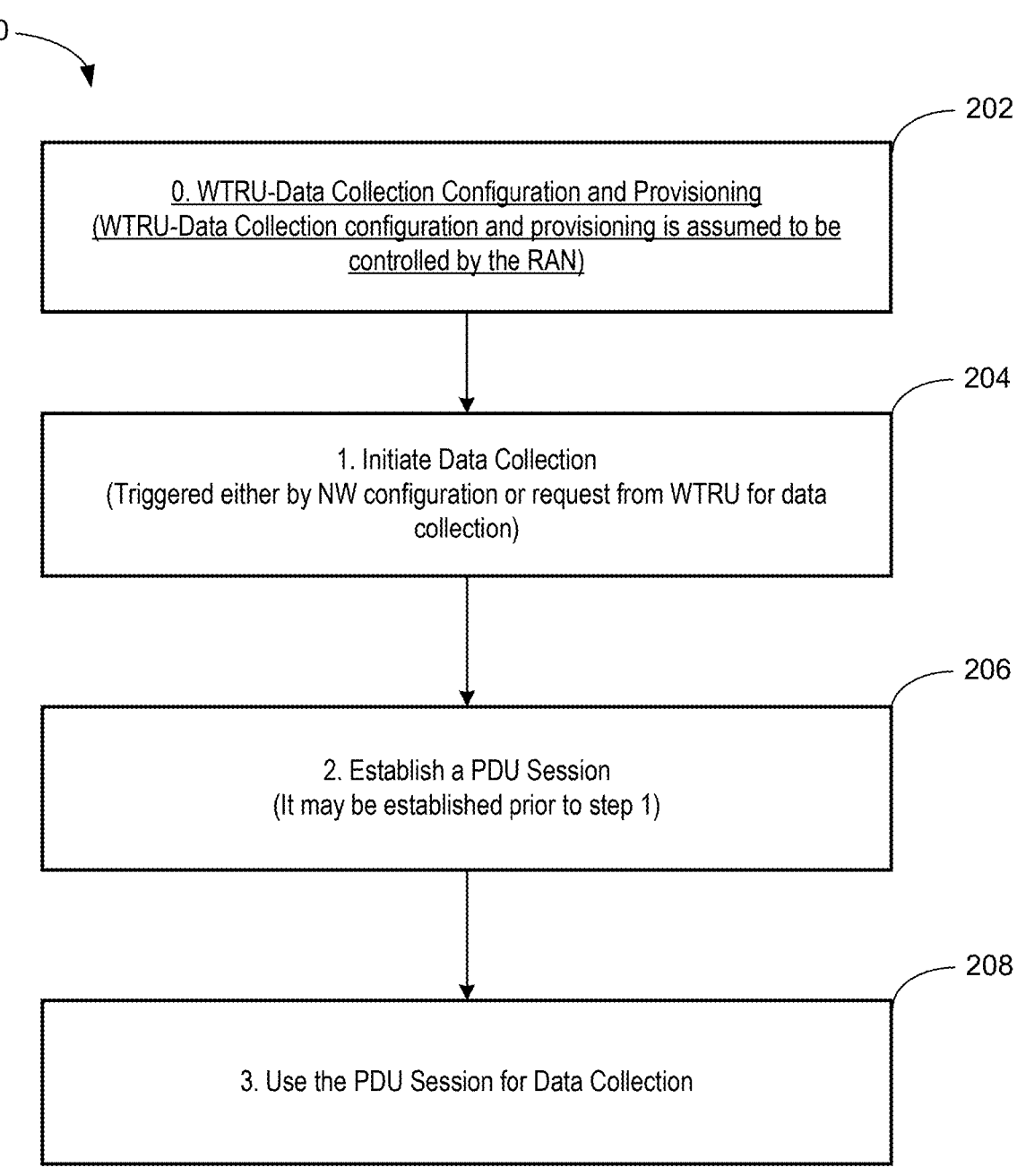

FIG. 2 is a flowchart illustrating an example data collection procedure according to an embodiment.

Figure 3:
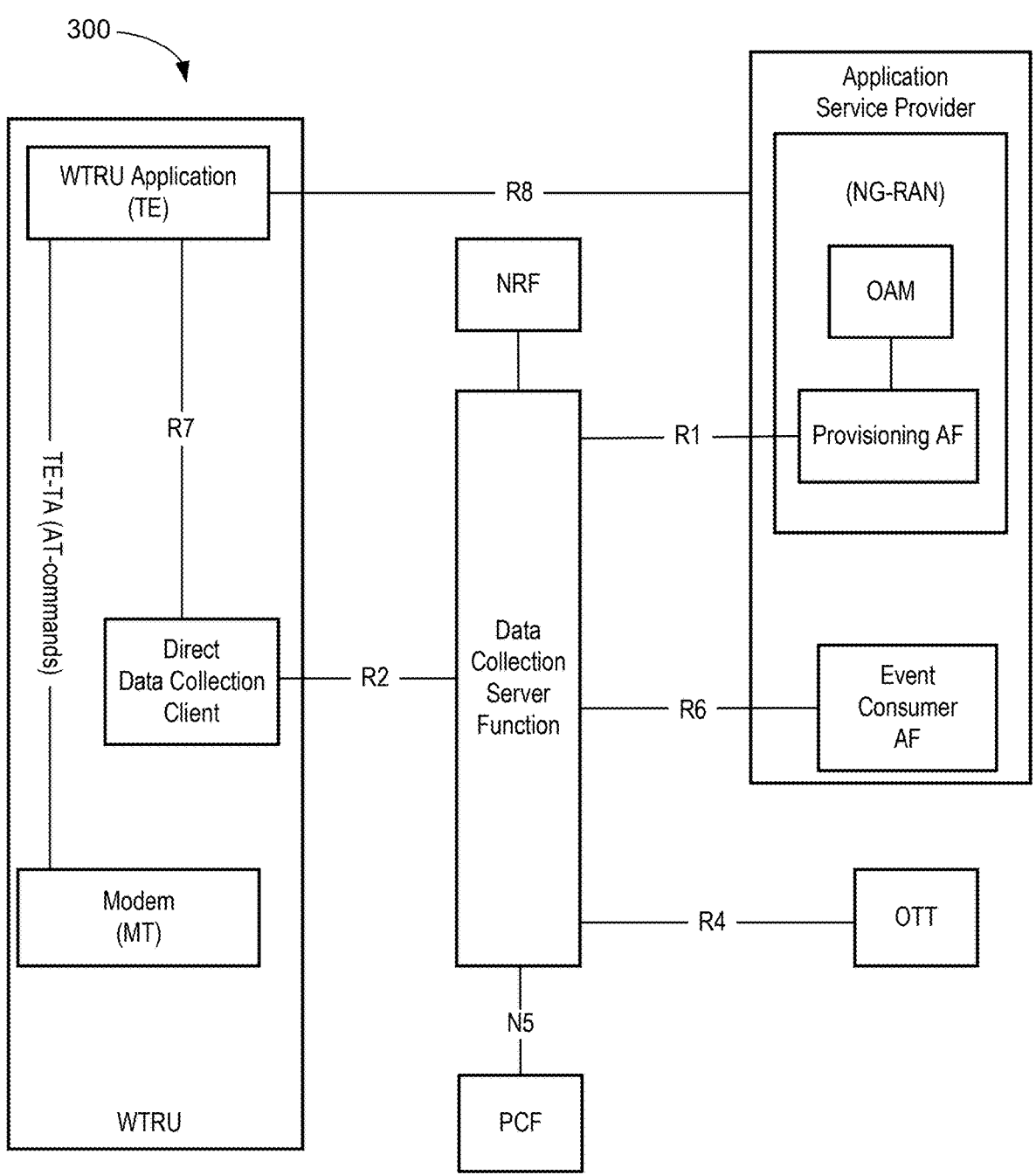

FIG. 3 is a system diagram illustrating an example high level architecture for MNO-controlled WTRU-data collection according to an embodiment.

Figure 4:

FIG. 4 is a system diagram illustrating an example internal view of a WTRU with direct data collection client and WTRU application access to data collection via AT-commands according to an embodiment.

Figure 5:
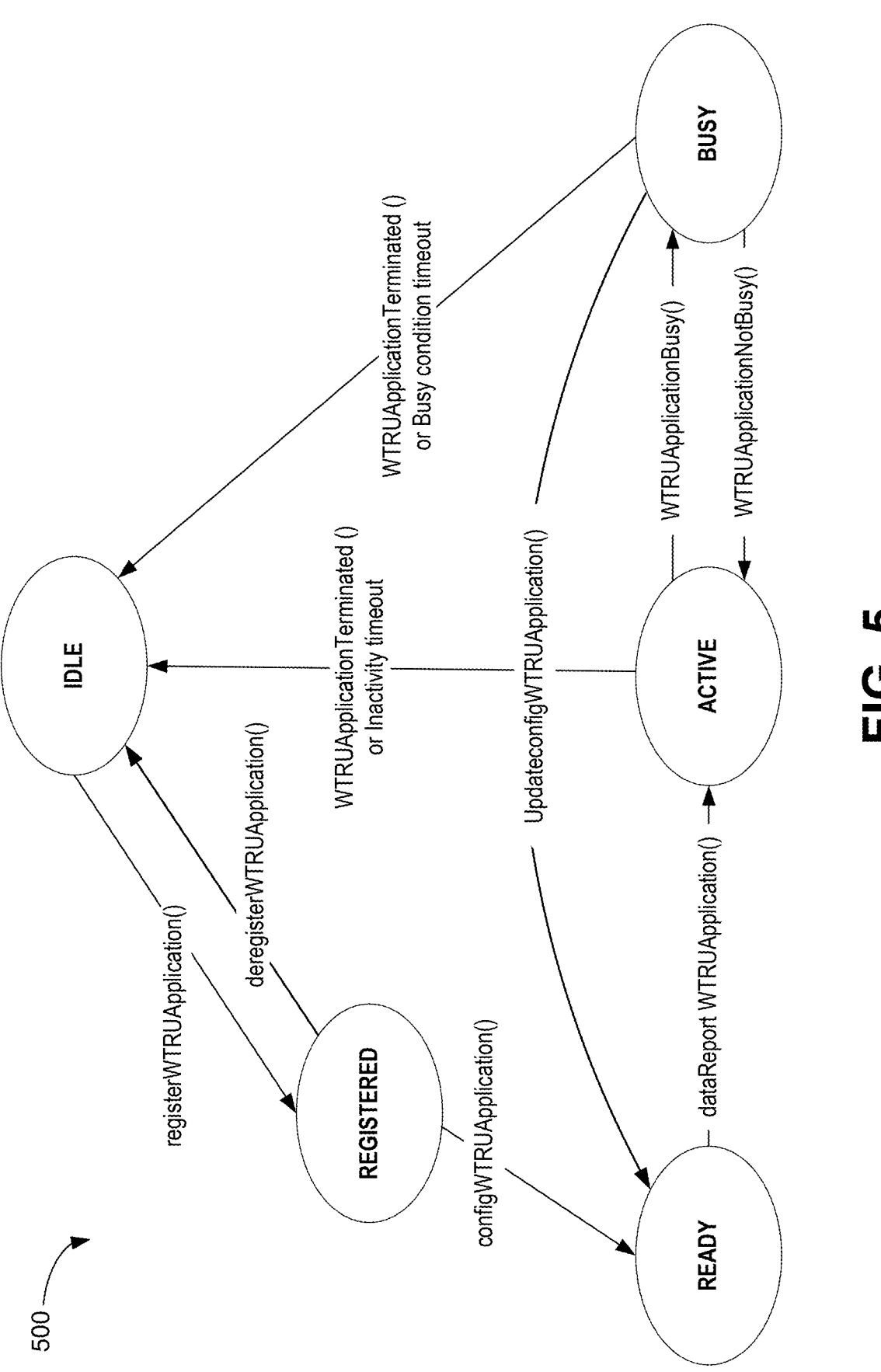

FIG. 5 is a system diagram illustrating an example enhanced direct data collection client state mode, supporting configuration of WTRU-data collection policies according to an embodiment.

Figure 6:
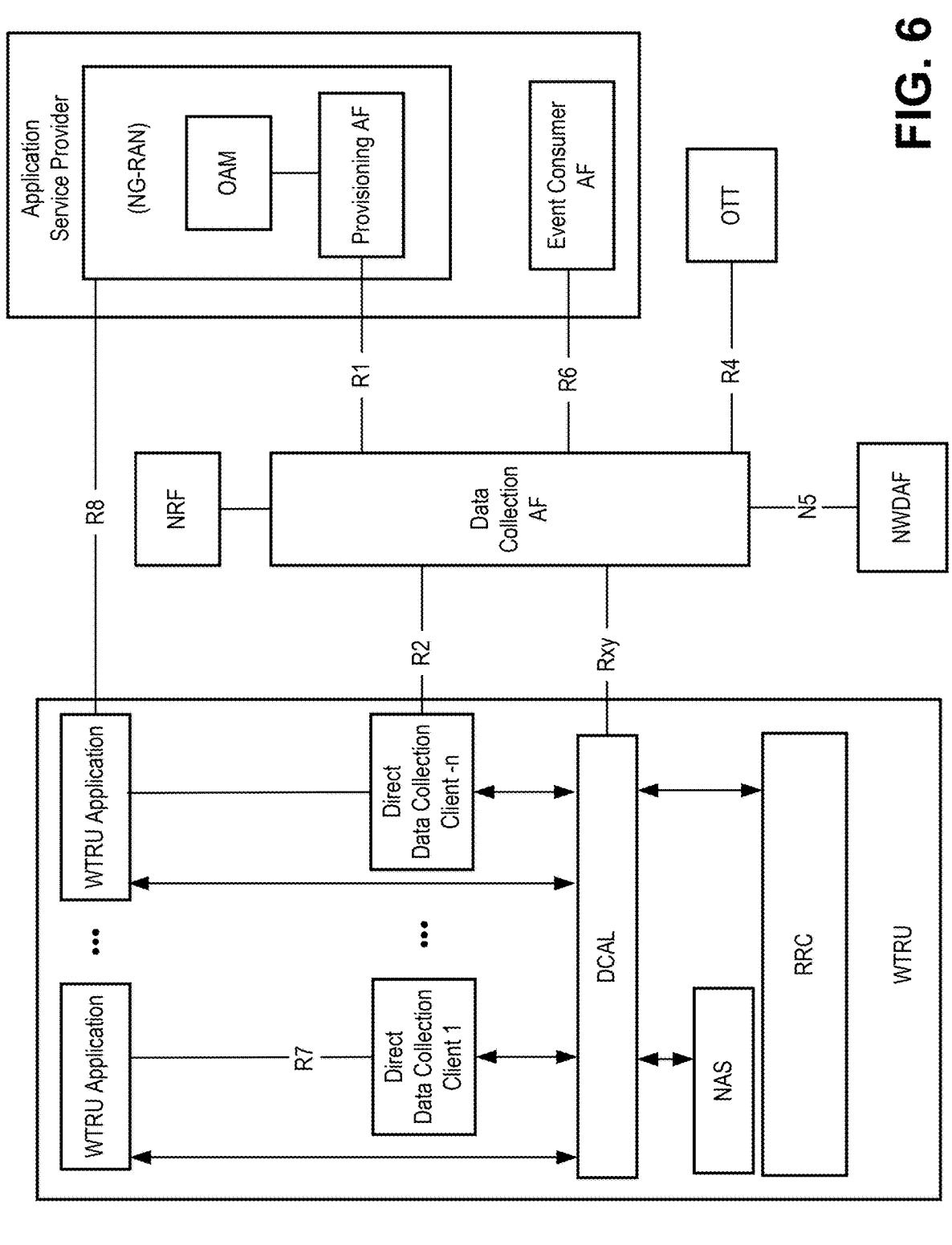
Figure 7A:
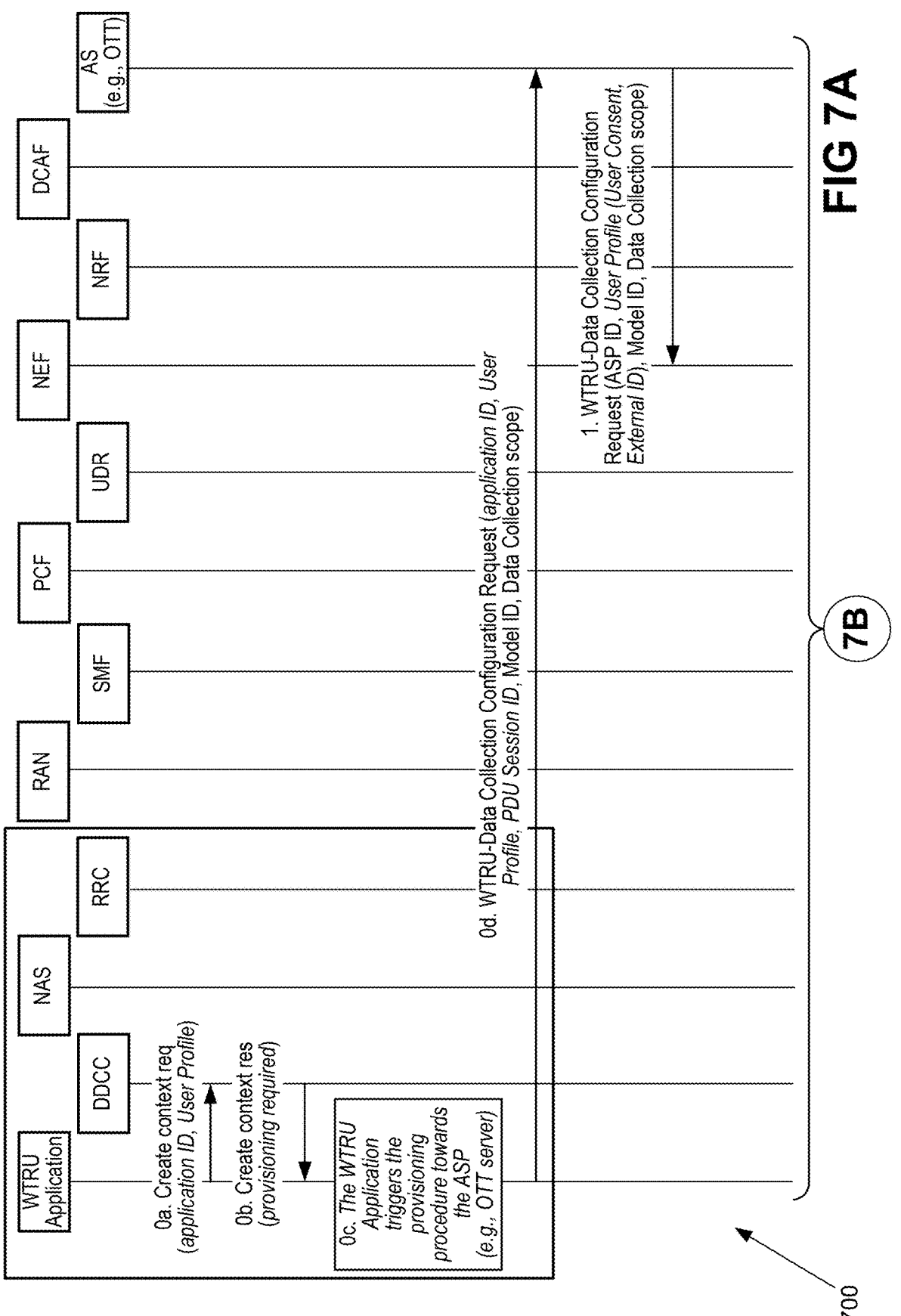
Figure 7B:
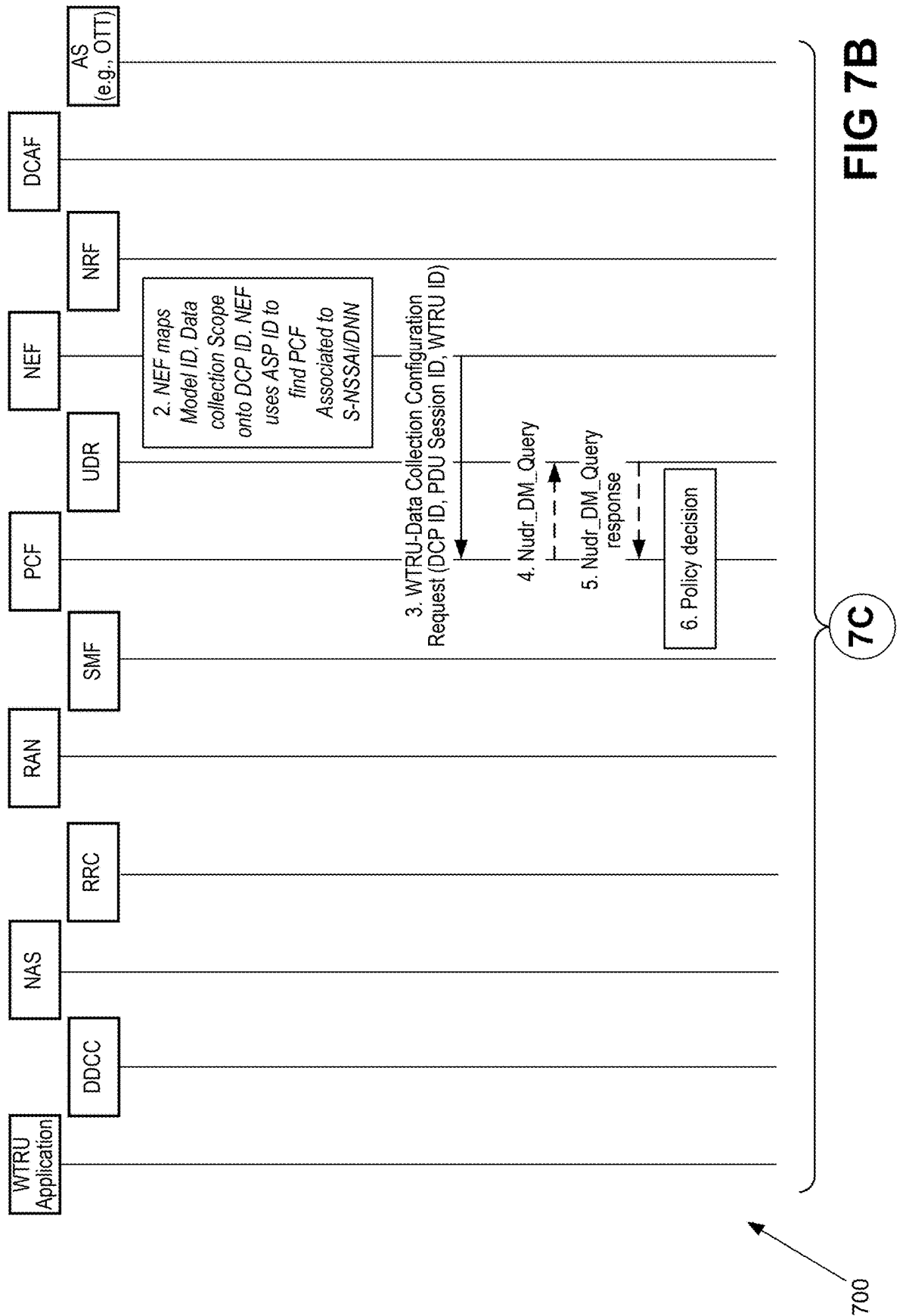
Figure 7C:
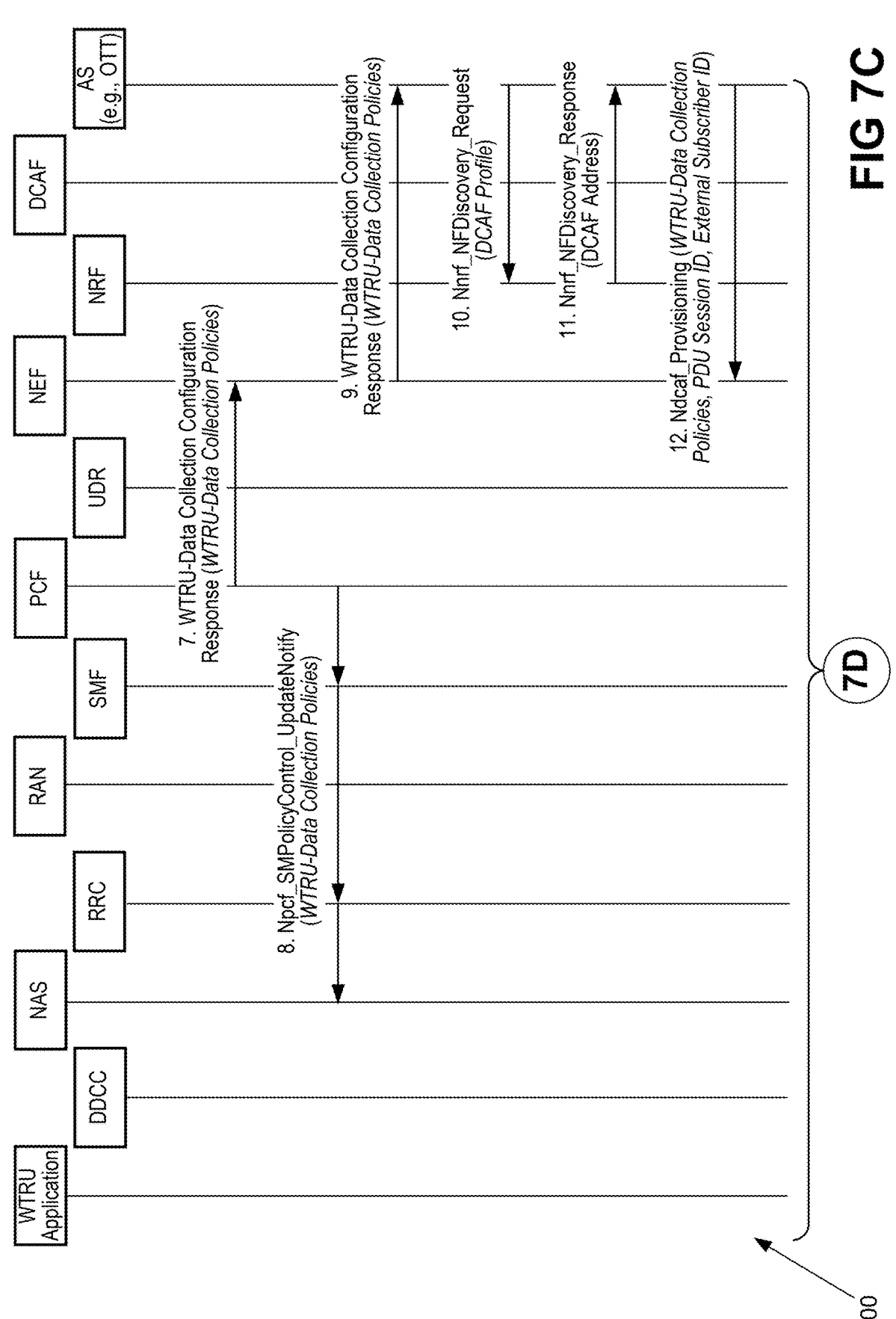
Figure 7D:
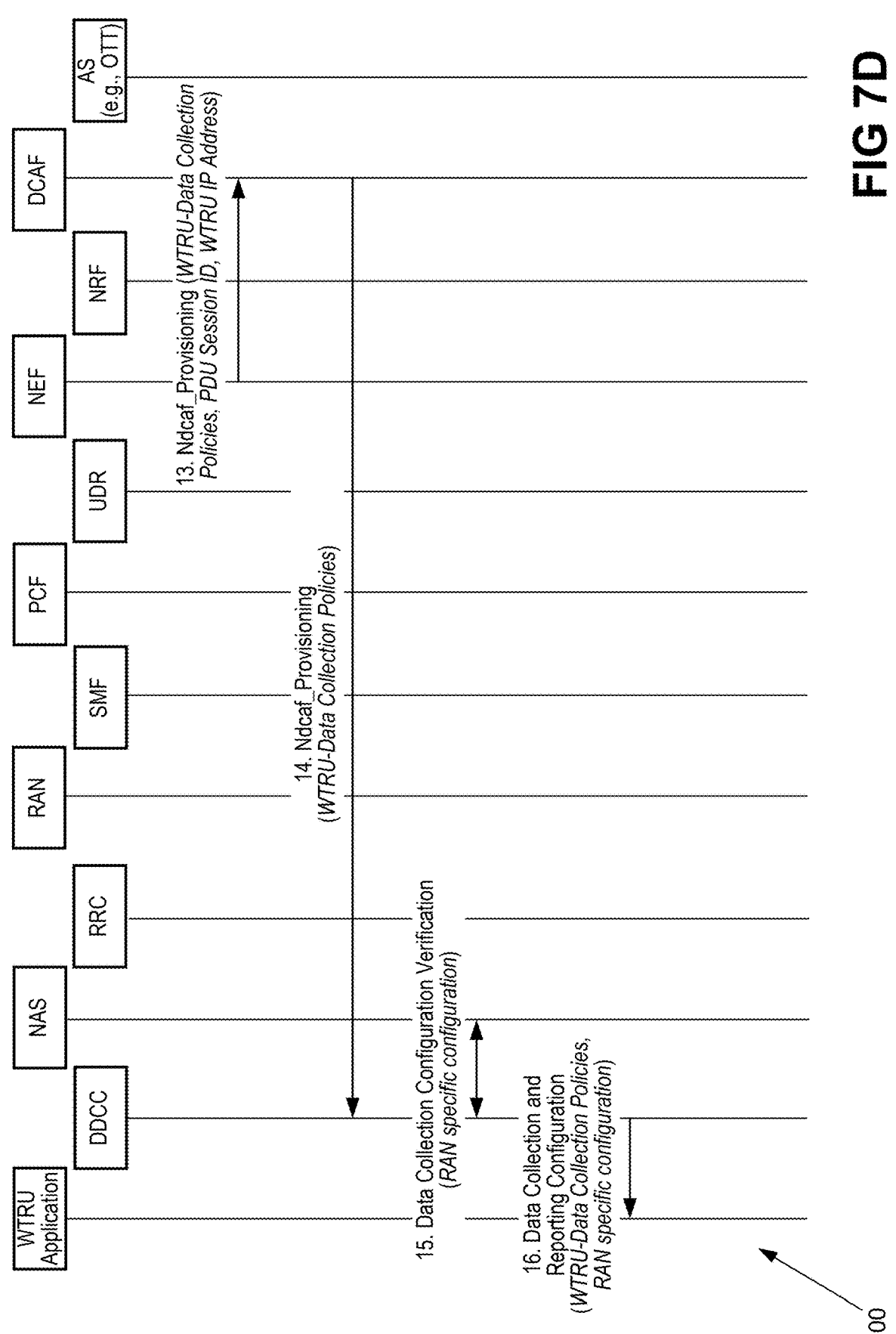

FIG. 6 is a system diagram illustrating an example data collection adaptation layer reference architecture according to an embodiment.

FIGS. 7A-7D is a flowchart illustrating an example provisioning of WTRU-data collection configuration information according to an embodiment.

FIG. 8 is a flowchart illustrating an example for controlling data collection according to an embodiment.

DETAILED DESCRIPTION

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU. Further, any description herein that is described with reference to a UE may be equally applicable to a WTRU (or vice versa). For example, a WTRU may be configured to perform any of the processes or procedures described herein as being performed by a UE (or vice versa).

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a halfduplex radio for which transmission and reception of some or all of the signals (e.g., associated with particular subframes for either the UL (e.g., for transmission) or the downlink (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz.

In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example procedures for how to enable a Mobile Network Operator (MNO) to control the configuration and/or reporting of WTRU-Data Collection are described herein. The terms RAN Node, eNodeB, gNodeB, and base station may be interchangeable. Data Collection generally refers to the WTRU logging data (e.g., measurements) and sending it to a Data Collection Server Function (DCSF). Context information is information that is provided by the network (e.g. a RAN Node and/or Core Network Node) about the network at the time when some corresponding piece of data was collected by a WTRU. The terms DCSF and/or Data Collection Server (DCS) may be used interchangeably.

In addition to the inputs that may be required for the inference by the AI/ML model and to be collected for the training purposes, the WTRU may also need to collect information regarding the "ground truth" (e.g., the value that the AI/ML model is expected to infer). For example, for the positioning use case, the ground truth may be the actual WTRU location. For example, for the beam prediction use case, the ground truth may be the signal level of the beams that are being predicted. All the examples described herein are applicable to inputs and/or the ground truth values (e.g., WTRU knowing the ground truth data type and/or format information implicitly from the functionality ID, WTRU being configured with measurements and/or configurations to acquire and/or log the ground truth information, etc.,).

Provisioning of WTRU-data collection configuration via WTRU actions may be implemented. In some examples, a WTRU may perform the following steps. For instance, a WTRU application may determine that WTRU-data collection configuration needs to be requested from an application server and the WTRU application sends a WTRU-data collection configuration request. The WTRU application may first request configuration information from a WTRU direct data collection (DDCC) entity and may include an application ID and/or a User Profile. The WTRU DDCC entity may command the WTRU application to request a new and/or updated WTRU-data collection configuration when the WTRU DDCC entity determines that no configuration exists. For instance, the WTRU may receive a WTRU-data collection policy at both the non-access stratum (NAS)/radio resource control (RRC) layer and application layer (via DDCC), and the WTRU may validate the WTRU-data collection policy received from the Application Server (AS), by comparing both instances of the same policy, based on the protocol data unit (PDU) session ID (e.g., what components of the WTRU-data collection policy provided by the AS the WTRU may be allowed to expose).

Provisioning of WTRU-data collection configuration via network exposure function (NEF) actions may be implemented. In some examples, a NEF entity may perform the following steps. For instance, a NEF entity may receive an application service provider (ASP) ID, a user profile, WTRU external identifier, ML model ID(s), and/or data collection scope. The NEF may use the ML model ID and data collection scope to derive a Data Collection Profile (DCP) ID. The NEF also uses the ASP ID to obtain the associated single network slice selection assistance information (S-NSSAI) and/or data network name (DNN). For instance, the NEF entity may send a WTRU data collection configuration request to a policy control function (PCF) and the WTRU data collection configuration request may include the DCP ID, PDU session ID, and/or WTRU ID.

Provisioning of WTRU-data collection configuration via PCF actions may be implemented. In some examples, a PCF entity may perform the following steps. For instance, a PCF entity may receive a WTRU data collection configuration request and may obtain the DCP ID, PDU session ID and/or WTRU ID. The PCF entity may use the received data to select a suitable WTRU data collection policy. For instance, the PCF entity may derive, based on the received information stated above, WTRU data collection policies. The PCF may use the DCP ID to determine what data may be collected, when it may be collected and what network entities the WTRU may send WTRU data collection to. For instance, the PCF entity may send a policy control update to the WTRU. The policy control update may include the WTRU-data collection policies the WTRU may use when collecting and reporting data, as instructed by the RAN and/or core network (CN).

Data collection control via WTRU actions may be implemented. In some examples, a WTRU may perform the following steps. For instance, a WTRU may receive a NAS and/or RRC message to start the data collection procedure. The message may include the IP address and/or fully qualified domain name (FQDN) of the data collection function. For instance, the WTRU may send a data reporting message to the data collection application function (DCAF) identified by the DCAF address previously received. Since the WTRU may have more than one DDCC, the WTRU may use the content of the RRC and/or NAS message previously received to correlate the appropriate DDCC associated to the RAN and/or public land mobile network (PLMN) where a previous message was received. For instance, the WTRU may send a data reporting message, using an appropriate PDU Session satisfying WTRU Route Selection Policy (URSP) rules (e.g., a PDU session associated to a DNN/S-NSSAI combination). For instance, the WTRU may receive a NAS and/or RRC message to trigger the WTRU to change its reporting behavior. The message may indicate that the data should no longer be reported. The message may indicate that the WTRU should collect, log and/or store the collected data.

Ensuring that an MNO may have full control on a standardized data collection process may be implemented. Current application layer mechanism may enable the collection and transfer of data from measurements and information provided by the WTRU. For example, specifications may support data collection and/or reporting at the application layer by enabling data collection entity at the WTRU to collect domain specific data. Multiple instantiations of domain specific data collection entities may be supported. The current specification states that the definitions of these instantiations are beyond the scope of a specification, and the realization of these logical functions may be implementation-dependent. It may not be clear how a MNO may have full control of standardized data collection when in fact the instantiation of domain specific data collection entity may be beyond the scope of a specification. Furthermore, the current WTRU-data collection framework relies on event identifiers and filter identifiers that are set by the NWDAF based on requests from network function consumers for specific network analytics. It may not be clear how the MNO can initiate, terminate, and manage WTRU-data collection without the involvement of NWDAF and without relying on event-based triggers. It may be desirable to enhance the 5G System and/or design a new system that enables operators to control, including configuring and deciding how these data are to be collected and/or what data can be collected.

Enabling the MNO to have full visibility for standardized collected data may be implemented. When collected data is transferred end-to-end (E2E) over the user plane using regular PDU sessions, at least two mechanisms may be used to transfer this data and both mechanisms may be realized using the user plane to transfer the collected data. This is either done directly using a data collection server function (DCSF) that may or may not be in the MNO trust domain, or indirectly over the application layer using a regular PDU session which is not explicitly identifiable from any other user data. Both scenarios may pose operators concerns since user data carried over the user plane may not be readily identifiable, unless other complex, proprietary mechanisms, such as deep packet inspection (DPI), are used to identify these data. It may be desirable to enhance the 5G System to enable the operator to have visibility (e.g., be aware of, access, and/or comprehend the data without) of the data that is being collected in the MNO network and that is transferred end to end (E2E) to a third-party application server (e.g., an over the top (OTT) server) for further processing, without the need to have access to domain specific data. Additionally and/or alternatively, it may be desirable that the operator be able to distinguish standardized data from proprietary data, in cases where partial visibility may be allowed.

Example procedures are described herein for how the existing WTRU data collection framework defined in specifications may be enhanced to enable WTRU data collection for WTRU-side model training, addressing specific requirements considering secure data collection, data confidentiality, MNO full controllability on the transfer of collected WTRU-data, MNO full visibility for standardized data, and/or relying on an extendable and futureproof design.

A DCSF may be configured to trigger a data collection procedure taking into consideration the existing WTRU-data collection framework, but without the constraint of always relying on NWDAF to trigger WTRU-data collection mechanism. Furthermore, the data collection mechanism may need to consider details of the specific RAN use case that is being addressed and ensure that measurements and metrics are configured based on these use cases.

The new and/or enhanced mechanism may ensure that the MNO is in full control of what data can be collected, when these data are transferred, and whether standardized or proprietary data is being transferred. Once triggered, the DCSF may determine one or more WTRUs to collect data from. For each determined and/or selected WTRU, the DCSF may configure and/or provision WTRUs to perform data collection based on operator policies that may be triggered based on specific events as defined by the RAN.

FIG. 2 shows an example of how data collection may be achieved. In procedure 200, at 204, the DCSF may initiate data collection as shown in FIG. 7. At 206, the WTRU may establish a PDU Session that can be used for Data Collection as shown in the procedure of FIG. 7. At 208, the WTRU, network, and/or DCSF may execute data collection procedures as shown in the procedure of FIG. 7 and FIG. 8.

Configuration and provisioning of WTRU-data collection may be implemented. For example, FIG. 3 illustrates a high-Level architecture example that describes how WTRU-data collection may be configured and provision in the WTRU using an enhanced WTRU-data collection and reporting mechanism. In diagram 300 the data collection server function (DCSF) may get its provisioning and configuration information from two sources. The DCSF may get its first provisioning and configuration information from radio related measurement configuration information from the next generation radio access network (NG-RAN), possibly using OAM procedures, over R1 interface. The DCSF may get its second provisioning and configuration information from using policy related configurations from the PCF over N5 interface (or equivalent service based interface), possibly extending the existing application specific policy information management to include WTRU-data collection reporting policies (e.g., to determine where to send collected WTRU data measurements, for example, based on whether the WTRU is at visited and/or home PLMN, based on the type of WTRU-data being collected, and/or possibly based on network conditions, including traffic load, or prevailing radio channel conditions). The data collection server function may further provision the direct collection client, and may configure the WTRU-data collection policies as received from the PCF. The direct data collection client may configure the WTRU-data collection application based on provisioning information received from the data collection server function. FIG. 4 and diagram 400 is a system diagram illustrating an example internal view of a WTRU with direct data collection client and WTRU application access to data collection via AT-commands according to an embodiment.

The proposed WTRU-data collection policies may, for instance, gate the transmission of WTRU-data collection, as configured in the direct data collection client, by the RAN, as part of the provisioning information and/or on demand. The provisioning information may also include allowance on data collection, based on the volume of data being collected and/or the type of data being collected, matched against a user consent that may be given on a per data type basis. WTRU-data transmission may also be gated based on time and/or location.

In some examples, a direct data collection client may either configure WTRU-data collection policies in the WTRU-data collection application, or direct data collection client may implement the policy control mechanism itself, and/or act on the reported collected WTRU-data, coming from the WTRU-data collection application.

In some examples, in order for the direct data collection client to implement the policy control, rather than configuring the WTRU-data collection application, the direct data collection client may need to have network conditions that allow the execution of the WTRU-data collection policies. This may be done using the status notification coming from the application.

If the direct data collection client does implement the policy control, its state model may be enhanced to reflect the impact of the MNO policies. FIG. 5 illustrates an example of how the current direct data collection client (DDCC) state model may change when MNO policies are included in the WTRU-data collection configuration. In diagram 500, for example, the DDCC may transition from BUSY to READY, or from BUSY to a new state (e.g., PAUSED), if the DDCC receives new WTRU-data collection policies from the NW, (e.g., from the PCF).

A data collection adaptation layer (DCAL) may be implemented. The data collection adaptation layer (DCAL) is a function layer deployed in the WTRU, logically placed below the DDCC and above RRC/NAS layer with reference to 5G NR protocol stack. The DCAL is depicted in the reference architecture for data collection and reporting in FIG. 6.

For example, in diagram 600, the DCAL layer may have dedicated interfaces with the following entities in the WTRU. For example, the DCAL layer may have a dedicated interface with the NAS layer (e.g., to send and/or receive data collection configurations, data collection trigger or trigger conditions from the core network). The DCAL layer may have a dedicated interface with the RRC layer (e.g., to send and/or receive data collection configurations, data collection trigger or trigger conditions from the RRC layer). The DCAL layer may have a dedicated interface with the DDCC(s) (e.g., to send and/or receive data collection configurations, data collection trigger or trigger conditions from the application layer). DCAL may serve as anchor point if there are multiple data collection clients on the WTRU, and all the request could be managed by the DCAL. The DCAL layer may have a dedicated interface with the WTRU application(s) (e.g., to send measurements and/or metrics collected from lower layers, as instructed by a WTRU-data collection configuration).

The DCAL layer may have a dedicated interface with the data collection application function (DCAF). This interface may be used to receive configurations and/or to report data to DCAF. The presence of DCAL may implement the functionality provided by R2 interface into Rxy.

The DCAL layer may store and/or buffer the data for a pre-determined time, per application and/or per-interface. The DCAL layer may implement policies that determine what data the WTRU is allowed to collect on a per application basis. Such a requirement may be provided to the DCAL as part of the data collection configuration from the data collection server function.

In some examples, the DCAL may receive data collection configurations from the DCAF. The configurations may be per application client and/or per application, carrying the details on when the data collection is triggered, then what data needs to be collected, stored and/or transmitted by each client for each application. The DCAL may configure each DDCC with their respective configurations. In some examples, the DCAL may receive a trigger for data collection (e.g., from RAN, NAS and/or from the DCAF), and based on that trigger respective DDCCs begin data collection.

Additional WTRU-data collection configuration considerations may be implemented. For example, the configuration and/or associated WTRU behavior for the data collection and/or transfer of the collected data may be controlled by the same network function/entity. The configuration and/or associated WTRU behavior for the data collection procedure may be controlled by an entity and/or function different from the entity and/or function controlling the transfer of the collected data. In some examples, the WTRU may be configured to transfer collected data immediately (e.g., every data sample and/or record).

In some examples, the WTRU may be configured to log the collected data before transferring it. For how long the logging is to be performed may be controlled by one or more of the following that is part of the data collection and/or transfer configuration. For example, how long the logging is to be performed may be controlled by a time limit (e.g., for a certain maximum time duration, until a certain absolute time in the future, within a give absolute start and end times, etc.). How long the logging is to be performed may be controlled by a size limit (e.g., until the collected data has reached a certain size (for example in Mbytes, and/or a certain number of samples and/or records), the free memory and/or buffer size at the WTRU goes below a certain level or percentage value, etc.). How long the logging is to be performed may be controlled by the quality and/or diversity of collected data (e.g., WTRU may be configured to collect data until the collected data fulfills some statical metrics and/or thresholds, for example, such as the range of the values collected in the measurements, mean value, frequency/distribution of some values or range of values, the standard deviation, etc.). How long the logging is to be performed may be controlled by location (e.g., WTRU goes outside of a given area, for example, group of cells, and does not return to one of the cells within the area for more than a certain time duration, WTRU goes in the coverage of a given area and remains there for more than a certain time duration, etc.). How long the logging is to be performed may be controlled by WTRU speed (e.g., WTRU speed falls outside a certain limit, for example, above and/or below a threshold, for more than a certain time duration, etc.). How long the logging is to be performed may be controlled by WTRU battery level (e.g., battery level goes below a certain percentage level). How long the logging is to be performed may be controlled by WTRU data activity (e.g., UL/DL user plane traffic rate) gets above a certain threshold, for example, in Mbps). How long the logging is to be performed may be controlled by the WTRU overheating level is reached. How long the logging is to be performed may be controlled by the WTRU UL power level and/or processing capability is reached and/or goes within a certain level in relation to the maximum level.

In some examples, the WTRU may be configured to perform the data collection and/or logging only when certain conditions are fulfilled. For instance, the conditions may be similar to the ones discussed above for stopping the logging, but in this case, the WTRU may just pause the data collection and/or logging and will resume it later if the conditions are fulfilled again (e.g., it won't stop the data collection and/or logging process altogether).

In some examples, the WTRU may be configured to start the data collection and/or logging as soon as it has got the configuration the WTRU requires for the data collection (e.g., measurement configuration). The WTRU may be configured to wait until certain condition(s) are fulfilled to start the data collection and/or logging (e.g., radio conditions of serving cell, relative or absolute time unit, location conditions such as being at a particular cell or within a given RAN or tracking area, WTRU speed is above/below/within a certain threshold(s), etc.). The WTRU may be configured to transfer the collected data after it has ended the collection and/or logging of the data according to any of the examples discussed above and herein. The WTRU may be configured to transfer the collected data upon explicit request (e.g., from the gNB, CN, OAM, DSCF, and/or application server and/or client, etc.). The WTRU may be configured to transfer the collected data periodically. The WTRU may be configured to indicate that a collected data is available and/or ready to be sent (e.g., the gNB, OAM, CN, DSCF, and/or application server and/or client, etc.).

In some examples, the collection data may be stored at AS level (e.g., WTRU variables at RRC level, and/or associated with even lower layer protocols such as MAC and/or PHY) and indication may be sent to the WTRU's application client when the data is ready to be sent (e.g., when the data collection has been stopped according to any of the examples above and herein, when a certain amount of data is collected, when certain type of data is collected, etc.). In some examples, the collected data may be a combination of data and/or information elements from several layers (e.g., one data sample sent can be a combination of the information elements from these different layers). The lower layers where the data is being stored may also be configured to send indication to the application client layer periodically, and may be further constrained by other criteria such as if a certain size and/or type of data is collected during that period, etc.

In some examples, the application client may send a request and/or poll to the lower layers requesting from the lower layers if any new data has been logged and/or if the data collection process is completed and data is ready to be sent. The lower layers may send an indication regarding the request and/or poll. In some examples, the application client may directly access the collected data (e.g., no further transfer from the lower layers to the application client may be required). In some examples, the application client at the WTRU may not have direct access to the collected data and the lower layers may explicitly send the data to the WTRU (e.g., via a request and/or response signaling, using the DCAL layer and/or interface discussed above and herein).

Additional aspects that may be considered are, for example, what part of the WTRU-data collection configuration is contained in either NAS and/or RRC layers, when the WTRU initiates the data collection. In some examples, the actual measurement configuration may be contained in the RRC. In some examples, aspects of privacy preserving configuration parameters and/or MNO policies may be contained at the NAS layer.

In some examples, the RRC may not contain the measurement configuration, but may contain what the WTRU needs to measure at a high level (e.g., just an indication of the use case or functionality) and/or some other configuration and/or condition (e.g., areas, times, cells IDs, etc., where the data needs to be collected from, etc.). The WTRU may check if it has the required configuration, if not, it may need to send a request to the gNB and/or LMF to get the required configuration (e.g., this could be a new request saying that I need to collect data for this use case, and/or it may contain detailed information such as the type and/or capability of model that is being trained). These can be based on some specified possible capabilities within a certain functionality. For example, for beamforming, the WTRU may indicate that it is collecting data for the spatial beam prediction case, and the model that is going to be trained has a certain required input and/or output. If the request sent to the gNB and/or LMF is not fulfilled, the WTRU may need to reject the data collection request and indicate the rejection (e.g. to the DSCF and/or whichever entity initiated the data collection).

There may be a mapping of the information elements for the different use cases (e.g., this may be a use case and/or functionality identity, and associated with it are the information elements that constitute a data sample for that use case), and the WTRU may check which of the information that it may measure with its current configuration. The WTRU may either reject the request, and/or send the request to be configured to measure the missing information from the RAN and/or LMF. For example, if the WTRU doesn't get the required configuration from the RAN and/or LMF, the WTRU may inform the entity and/or function that it is trying to configure it.

WTRUs may be configured to do data collection but currently they are not able to (e.g., they don't have required configuration, they are too busy with UL/DL data transmission/reception, etc.). The WTRU may start to do the data collection later when the conditions are fulfilled (e.g., a rather passive and/or opportunistic approach, where if the WTRU gets configured to measure something and/or if that can be used for training a model, then the WTRU may do the logging and/or send the data to the data collection sink). In some examples, deadlines and/or validity periods may be specified (e.g., data older than a certain time duration may not be useful). In some examples, visibility and/or checkup may be a function that determines which entity and/or layer ensures that the WTRU is actually sending the data that it is configured to send but nothing more and/or else (e.g., to see if the WTRU is putting timestamp values in the time field, RSRP values in the radio signal level field, etc.). DCAL may implement this visibility and/or checkup procedure (e.g., based on policies provided by the NAS layer).

In some examples, WTRUs collecting the data may already be executing some AI/ML functionality (e.g., the data they are collecting may be used for performance monitoring), therefore these WTRUs that are already executing an AI/ML functionality and/or using specific ML models already, may be activated (e.g., by the RAN, the LMF, and/or the DDCC). When the AI/ML functionality is used for data collection, the inferred values may not be used (e.g., predicted beam not sent to the network), but rather they will be just sent to the DDCC to be further transmitted to an external server.

Procedures for provisioning of WTRU-data collection configuration may be implemented. FIG. 7 describes an example MNO-controlled procedure to safely provision WTRU-data collection configuration information in a WTRU. For example, in diagram 700 (e.g., FIG. 7A) at 0a, a WTRU application may request to be configured for WTRU-data collection by issuing a create context request message and providing its application ID and a user profile that may contain a user consent and/or a user ID within the scope of the application or an external identifier known to the application. At 0b, a direct data collection entity (e.g., DDCC) which may receive the WTRU-data collection configuration request may determine that no configuration information exists and/or it needs to be updated from the network (e.g., configuration information needs to be downloaded from the RAN, CN and/or an external ASP server). At Oc, since the configuration request from the DDCC entity was not granted, the WTRU application triggers a request from the application server to initiate a new and/or updated provisioning procedure. At Od, the WTRU application may send a WTRU-data collection configuration request to the application server, and the WTRU-data collection configuration request may include the associated application ID, the User Profile (e.g., which may contain the user consent and external identifier). The WTRU-data collection configuration request may also include the PDU session ID associated with the current connection, and/or any other relevant PDU session ID (e.g., if the application has triggered more than one PDU session). The WTRU application may use attention commands (AT-Commands) to retrieve the PDU session ID it may have been provided by the DDCC, and/or the WTRU application may use a instantiation of a DCAL layer to retrieve this information (e.g., the PDU session ID). At 1, the application server (e.g., an OTT server) may send a WTRU-data collection configuration request message, through the network exposure function (NEF), and the message may include the ASP ID and/or application ID, the user profile and/or an external identifier associated to the WTRU and/or WTRU that may trigger the WTRU-data collection configuration request. The AS may also include model ID(s), data collection scope to enable the NEF to derive a data collection profile ID (DCP ID).

For example, in diagram 700 (e.g., FIG. 7B) at 2, the NEF may map the model ID, data collection scope onto a DCP ID, and the NEF may use the ASP ID to find the associated DNN and/or S-NSSAI The NEF may also map the external identifier onto a WTRU ID (e.g., subscription permanent identifier (SUPI)). At 3, the NEF may forward the WTRU-data collection configuration request to the PCF, and the WTRU-data collection configuration request may include the mapped DCP ID, PDU session ID and/or WTRU ID. At 4, the PCF may attempt to fetch existing WTRU data collection policies from the unified data repository (UDR), if they already exist. At 5, if WTRU data collection policies exist, the UDR may respond to the PCF with the existing policies. At 6, the PCF derives the WTRU data collection policies.

For example, in diagram 700 (e.g., FIG. 7C) at 7, the PCF sends the derived WTRU data collection policies to the NEF. At 8, the PCF may also send the newly created and/or updated policies to the session management function (SMF) and the SMF may send these polices to the RAN and/or the NAS layer in the WTRU via the access and mobility management function (AMF, not shown). The PCF may also provide the PDU session ID. At 9, the NEF may forward the new and/or updated WTRU-data collection policies to the AS, that may include the DCAF profile of the DCAF the PCF has chosen to handle the WTRU-data collection configuration provisioning. At 10, the AS may use the network function repository function (NRF) to find the DCAF. The NEF may have sent the DCAF address directly to the AS rather than the DCAF profile, but using the NRF may ensure that the latest DCAF is selected. At 11, the NRF may resolve the AS request and may provide the DCAF address (e.g., IP address of FQDN). At 12, the AS may send the provisioning information to the NEF, and may provide the WTRU-data collection policies, PDU session ID, and/or external identifier. The NEF may resolve the external identifier into the WTRU IP address.

For example, in diagram 700 (e.g., FIG. 7D) at 13, the NEF may forward the WTRU-data collection policies, PDU session and/or the WTRU IP address to the DCAF. At step 14, the DCAF may send the WTRU-data collection policies to the DDCC using the IP address provided by the NEF. At step 15, the DDCC, using the PDU session ID and/or possibly through AT-Commands, may validate the WTRU-data collection policies against the policies sent to the session management entity in the NAS layer, and may also retrieve RAN specific configuration. Configuration updates and/or revocation of permission to transfer collected data from the DDCC to the DCSF (e.g., DACF) may be sent at any time from the NAS and/or RRC layer to the DDCC. Additionally and/or alternatively, the initiation and/or termination of data collection and reporting may be triggered and/or controlled by the RRC and/or NAS layers at any time. At step 16, the DDCC may configure the WTRU application using both the received WTRU-data collection policies and/or the RAN configuration. The WTRU-Data Collection Policies and RAN configuration information tell the WTRU Application, when and under what circumstances Collected Data can be reported.

Procedures for controlling data collection may be implemented. FIG. 8 describes an example of steps on how a DDCC in the WTRU may be used for data reporting and controlled by the network. For example, in procedure 800 at 802, the WTRU may receive a NAS message from the core network and/or a RRC message from a base station that may indicate that the WTRU should begin data collection procedures. The message may include an IP address or FQDN of a data collection AF (DCAF). At 804, receipt of the message may cause the WTRU to trigger a data collection client (DDCC) in the WTRU to initiate a data reporting session. Receipt of the message may trigger the DDCC to invoke an Ndcaf_DataReporting_CreateSesion service operation of the DCAF. The DDCC may determine the identity of the DCAF and/or the destination of the Ndcaf_DataReporting_CreateSesion service operation based on the IP address and/or FQDN that was in the NAS and/or RRC message.

The WTRU may host more than one DDCC. For example, the WTRU may host a DDCC that is associated with the 5GC of the WTRU's Home Public Land Mobile Network (HPLMN). The WTRU may host DDCC(s) that are specific to the RAN's of PLMNs that the WTRU may access. For example, the WTRU may host a first DDCC that is associated with a first RAN of a first PLMN and the WTRU may host a second DDCC that is associated with a second RAN of a second PLMN. When the WTRU receives a NAS message that requests that the WTRU begin data collection procedures and the NAS message originated from the 5GC of the WTRU's HPLMN, the WTRU may use the content of the message to trigger the DDCC that is associated with the HPLMN Core Network DDCC. When the WTRU receives an RRC message that requests that that begin data collection procedures, the WTRU may use the content of the message to trigger the DDCC that is associated with the RAN of the PLMN that send the RRC message. In some examples, WTRU may receive a RRC and/or NAS message that initiates data collection. The WTRU may use the identity of the PLMN that is the source of the message and the type of message (e.g., RRC and/or NAS) to identity which DDCC in the WTRU needs to be triggered and/or addressed. For example, an RRC Message from an NG-RAN base station of PLMN-x may be routed to a DDCC that is associated with NG-RAN data collection and PLMN-x. For example, a NAS Message from the unified data management (UDM) of PLMN-y (e.g., the HPLMN) may be routed to a DDCC that is associated with the core network of PLMN-y. For example, a NAS Message from the AMF of PLMN-z (e.g., a VPLMN) may be routed to a DDCC that is associated with the core network of PLMN-z.

At 806, the DDCC may attempt to send the Ndcaf_DataReporting_CreateSesion service operation request to the DCAF. The request may be sent to the IP address of the DCAF and/or URSP evaluation may be triggered and/or used by the WTRU to determine the characteristics of the PDU session that this message may be sent on. For example, if the DCAF that is being addressed is associated with a visited public land mobile network (VPLMN), then the URSP rules may be configured to choose a DNN and/or S-NSSAI for traffic to the IP address that may configure a local break out (LBO) PDU session so that the PDU session may be anchored in the VPLMN. At 808, the WTRU and/or DDCC may use USRP rules to select and/or establish a PDU session. At 810, the DDCC may invoke the Ndcaf_DataReporting_Report service operation to report data to the DCAF.

At 812, the WTRU may receive a RRC and/or NAS message that instructs the WTRU to change the WTRU's reporting behavior. For example, the message may indicate to the WTRU that data should no longer be reported (e.g., the message may indicate that reporting should be paused). For example, the message may indicate to the WTRU that data should be collected, logged (i.e. stored) and/or reported later. The message may indicate when the data should be reported and/or indicate that the WTRU should not report the data until the WTRU receives a new trigger message. Additionally and/or alternatively, the message that the WTRU receives may not be directly related to data collection but may still cause the WTRU to change its reporting behavior. For example, the WTRU may determine to stop data reporting based on a handover event. For example, the WTRU may determine that a DDCC that is associated with the RAN of a first PLMN should stop reporting when the WTRU begins to be served by the RAN of a second PLMN.

At 814, the mobile terminating (MT) part of the WTRU may send the new configuration and/or behavior instructions that were received in step 6 to the DDCC. At 816, the WTRU may receive a second RRC and/or NAS message that instructs the WTRU to change the WTRU's reporting behavior. For example, this message may indicate that the WTRU should begin reporting logged data. At 818, the DDCC may invoke the Ndcaf_DataReporting_Report service operation to report data to the DCAF.

The invention claimed is:

1. A wireless transmit/receive unit (WTRU) comprising:
   a processor configured to:
   determine that a data collection configuration is not available from a direct data collection client (DDCC) of the WTRU;
   send a request associated with the data collection configuration to an application server, wherein the request comprises an application identifier, an indication of a user profile, and a protocol data unit (PDU) session identifier; and
   receive the data collection configuration, wherein the data collection configuration comprises data collection policies that indicate conditions upon which the WTRU is to collect data, and wherein the data collection policies indicate whether and where the WTRU is to send the collected data.

2. The WTRU of claim 1, wherein the conditions indicated by the data collection policies comprise a time limit, a size limit, location of the WTRU, a speed of the WTRU, a battery level of the WTRU, or a data activity of the WTRU.

3. The WTRU of claim 1, wherein the data collection policies indicate whether and where the WTRU is to send the collected data based on (i) location of the WTRU, (ii) a data type associated with the collected data, (iii) network conditions, or (iv) time.

4. The WTRU of claim 1, wherein the processor is configured to:
   send the collected data in accordance with the data collection configuration.

5. The WTRU of claim 1, wherein the processor is configured to:
   send a request to the DDCC for the data collection configuration, wherein the request comprises the application identifier and the indication of the user profile;
   receive a response from the DDCC that indicates that the data collection configuration does not exist at the DDCC; and
   determine that the data collection configuration is not available from the DDCC based on the response from the DDCC.

6. The WTRU of claim 1, wherein the processor is configured to determine the PDU session identifier via use of attention (AT)-commands.

7. The WTRU of claim 1, wherein the processor is configured to receive the PDU session identifier from the DDCC.

8. The WTRU of claim 1, wherein the processor is configured to determine the PDU session identifier via an instantiation of a data collection adaptation layer (DCAL) layer.

9. The WTRU of claim 1, wherein the processor is configured to receive the data collection configuration at an application layer via the DDCC.

10. The WTRU of claim 1, wherein the processor is configured to:
   validate the data collection configuration based on a comparison between the data collection policies of the data collection configuration and a configuration received from a radio access network (RAN).

11. A method performed by a wireless transmit/receive unit (WTRU), the method comprising:
   determining that a data collection configuration is not available from a direct data collection client (DDCC) of the WTRU;
   sending a request associated with the data collection configuration to an application server, wherein the request comprises an application identifier, an indication of a user profile, and a protocol data unit (PDU) session identifier; and
receiving the data collection configuration, wherein the data collection configuration comprises data collection policies that indicate conditions upon which the WTRU is to collect data, and wherein the data collection policies indicate whether and where the WTRU is to send the collected data.

12. The method of claim 11, wherein the conditions indicated by the data collection policies comprise a time limit, a size limit, location of the WTRU, a speed of the WTRU, a battery level of the WTRU, or a data activity of the WTRU.

13. The method of claim 11, wherein the data collection policies indicate whether and where the WTRU is to send the collected data based on (i) location of the WTRU, (ii) a data type associated with the collected data, (iii) network conditions, or (iv) time.

14. The method of claim 11, wherein the method further comprises:
   sending the collected data in accordance with the data collection configuration.

15. The method of claim 11, wherein the method further comprises:
   sending a request to the DDCC for the data collection configuration, wherein the request comprises the application identifier and the indication of the user profile;
   receiving a response from the DDCC that indicates that the data collection configuration does not exist at the DDCC; and
   determining that the data collection configuration is not available from the DDCC based on the response from the DDCC.

16. The method of claim 11, wherein the method further comprises determining the PDU session identifier via use of attention (AT)-commands.

17. The method of claim 11, wherein the method further comprises receiving the PDU session identifier from the DDCC.

18. The method of claim 11, wherein the method further comprises determining the PDU session identifier via an instantiation of a data collection adaptation layer (DCAL) layer.

19. The method of claim 11, wherein the method further comprises receiving the data collection configuration at an application layer via the DDCC.

20. The method of claim 11, wherein the method further comprises:
   validating the data collection configuration based on a comparison between the data collection policies of the data collection configuration and a configuration received from a radio access network (RAN).

* * * * *